US006565618B1

(12) United States Patent
Ishizuka

(10) Patent No.: US 6,565,618 B1
(45) Date of Patent: May 20, 2003

(54) DIAMOND ABRASIVE PARTICLES AND METHOD FOR PREPARING THE SAME

(76) Inventor: Hiroshi Ishizuka, 19-2, Ebara 6-chome, Shinagawa-ku, Tokyo (JP)

( * ) Notice: Subject to any disclaimer, the term of this patent is extended or adjusted under 35 U.S.C. 154(b) by 0 days.

(21) Appl. No.: 09/763,804

(22) PCT Filed: Aug. 30, 1999

(86) PCT No.: PCT/JP99/04684

§ 371 (c)(1),
(2), (4) Date: Feb. 27, 2001

(87) PCT Pub. No.: WO00/12647

PCT Pub. Date: Mar. 9, 2000

(30) Foreign Application Priority Data

Aug. 28, 1998 (JP) ............................................ 10-281880
Jun. 16, 1999 (JP) ............................................ 11-170290

(51) Int. Cl.$^7$ ............................. C09K 3/14; C09G 1/02; C09C 1/68
(52) U.S. Cl. ........................................... 51/307; 51/293
(58) Field of Search .................................... 51/307, 293

(56) References Cited

U.S. PATENT DOCUMENTS 4,012,300 A * 3/1977 Caveney ................ 204/157.44
4,409,712 A * 10/1983 Takehara ................... 264/29.1
5,759,216 A * 6/1998 Kanada et al. ................. 51/295

FOREIGN PATENT DOCUMENTS

EP 753481 * 1/1997

* cited by examiner

*Primary Examiner*—Michael Marcheschi
(74) *Attorney, Agent, or Firm*—Larson & Taylor PLC

(57) ABSTRACT

Diamond particles are provided having a nominal size of 5 μm or less by D50 measurement and which comprise an explicit thermal effect such as a minute crack in the crystal structure due to a heat treatment at a temperature at least of 1000° C. The diamond particles include diamond converted non-diamond carbon in an amount of at least 0.5% by weight relative to the whole diamond particle. A method for synthesizing the diamond particles includes providing diamond particles having a primary particle D50 average size of 50 nm or greater, subjecting the diamond particles to a heat treatment at a temperature of at least 1000° C. in either a non-oxidizing atmosphere or in a vacuum, and converting the diamond partly to non-diamond carbon.

24 Claims, No Drawings

DIAMOND ABRASIVE PARTICLES AND METHOD FOR PREPARING THE SAME

TECHNICAL FIELD

This invention relates to abrasive diamond particles, and method for producing the same, suitable for the use as slurry suspended in a medium. Such particles are in particular useful for the texturing process of fixed disk blanks of nickel-coated aluminum.

TECHNICAL BACKGROUND

The precision has remarkably improved over these years in the polishing and buffing process. Electronic industries, for example, are experiencing a rapid increase in the memory capacity of fixed disks, due mainly to decreased gaps between the disk and the magnetoresistive head, which is achieved as a result of improved surface precision of the recording mediums. Very minute diamond particles of especially sub-micron sizes are commonly employed for the polishing and buffing processes for such mediums and heads.

Micron-size and smaller diamond abrasive is used either as fixed in formed disks or as slurry of loose particles that are dispersed and suspended in a medium. Uses of slurry remain still common, although needs are rising for fixed particles for a better grit economy.

For slurry applications diamond of 5 $\mu$m or less are commonly used and especially preferred are sub-micron particles which have an average size of 1 $\mu$m or less.

In machining processes using a slurry, it is required that diamond particles remove the work material efficiently in relation with time. Also it is essential that the finished surface roughness be minimized, while least of them be left sticking on the surface of rather soft work material. In general, however, the first requirement cannot be achieved at the same time with the second or third.

In those circumstances polycrystalline type diamond particles are commonly favored for precision machining applications, in which primary particle crystallites, of tens of nanometers in size, cohere together to make up secondary particles of several micrometers.

Such polycrystalline diamond however is produced in general by dynamic compression techniques which are based on the detonation of much explosive, so many restrictions that are often imposed on the processes make the products too expensive for common applications.

Therefore one of the principal objects of the present invention is to provide a diamond abrasive of minute single crystal type, whereby, while diamond crystals from normal static compression processes is used as the starting material, those three requirements can be met at the same time and, further, controlled separately for adapting particular work materials.

DISCLOSURE OF INVENTION

In the invention diamond particles having a size of a few micrometers are heated and held at a temperature of 1000° C. or more, either in a vacuum or in an atmosphere of inert gas such as nitrogen, argon and helium. Diamond is thereby converted in part, especially on the surface, to non-diamond carbon, which essentially comprises graphite, amorphous carbon and turbostratic carbon.

Minute cracks are formed in the heat treatment of the invention. This occurs probably as a result of the conversion to non-diamond carbon, which becomes promoted by the metallic occlusion and inclusion in molecular or atomic state within the diamond particle.

As employed for polishing applications the diamond particles of the invention can achieve a smoother finished surface, due probably to the combined effect of the amorphous carbon or graphite as lubricant and buffer for the intermittent loading when the abrasive particles come in contact with the work surface during a machining process.

Due to those internal cracks the particles of the invention, when under an excessive loading, are crushed, and chipped off, just within rather a limited zone in the vicinity of the cutting edges that have engaged with the work. This prevents the occurrence of significant scratches on the work surface as in the case of polycrystalline type, where primary or smaller particles gather firmly to make up a secondary or larger particle. Also effective are fragments that are off from the particle bulk, to yield a decreased roughness on the finished work surface.

Moreover fresh cutting edges take over automatically at the sites of chipping, in order to achieve an uninterrupted polishing process. That is an improved machining efficiency is attainable in terms of stock removal over a unit time per abrasive particle.

BEST MODE FOR CARRYING OUT PREFERRED THE INVENTION

In the invention the conversion of diamond to non-diamond carbon (NDC) may be readily evaluated by wet oxidization technique, whereby a mixture of diamond with such diamond-turned carbon is intensely heated in concentrated sulfuric acid or concentrated nitric acid or their mixture. After the latter has been completely oxidized and removed from the outer surfaces and open cracks, the weight change thus caused over from the acid treatment is calculated to determine the carbon concentration or yield.

Raman spectroscopy is also available for evaluating the relative concentration of non-diamond carbon to diamond in the mixture. This technique permits a quicker determination at a higher sensitivity, although special equipment is required. Here we use for the index the ratio in peak height, or spectral intensity data acquired at a specific wave number that corresponds to graphite or amorphous carbon to diamond, the former occurring between 1500 and 1600 cm$^{-1}$ and the latter, in the vicinity of 1330 cm$^{-1}$.

In said spectroscopy the peak height is measured as such above the straight base line that passes the data points at 1200 and 1700 cm$^{-1}$ as the both limits of the observed wave length. Evidently the absolute data values inevitably may differ to a degree from equipment to equipment. Our data were obtained by using JASCO NR-1800 Raman Spectroscope.

Raman spectroscopy is an efficient technique for detecting non-diamond carbon, as its sensitivity is commonly 50 to 80 times higher than that for diamond. The benefits of this invention is attained, as observed by this technique, when diamond-turned non-diamond carbon is contained at a G-D index of 0.1 to 4.0, and more between 0.2 and 2.0, especially 0.3 and 1.0.

At an index of 0.1 or less such benefit is not remarkable that the stock removal is efficient and the surface roughness is insignificant. At 4.0 or more, on the other hand, the diamond particles have excessively decreased rigidity and become ineffective for the machining as not capable of achieving an adequate stock removal.

The diamond particles of the present invention, due to the specific heat treatment, exhibit a significant improvement in surface roughness of the finished work when employed for the machining of, at least, the materials described herein. As heat-treated the particles have a somewhat varied average size, and yield an 80% surface roughness relative to the same diamond lot as untreated, in the machining process for the specified work material. The surface condition is observed by atomic force microscopy (AFM).

For the heat treatment of the invention is available a temperature between 1100° and 1400° C. In particular good results can be obtained in both stock removal (machining efficiency) and surface roughness when treated at 1200° to 1300° C. Such temperature is maintained for 3 to 48 hours dependently upon the batch volume.

The treated diamond of the invention is in particular adapted for the texturing of fixed disks of nickel coated aluminum alloy as a recording medium for computers. In the machining with conventional diamond abrasive, without such treatment, a significant number (around four per disk in average) of particles are found left sticking to the work material, as a result of the contact too hard. None are observed on the work when processed with the diamond particles of the invention, in which an optimized proportion of non-diamond carbon is provided between the diamond and the work and also the diamond particles are imparted with proper friability.

The environment for the heat treatment is set non-oxidizing for diamond, which may be either a vacuum of pressure not exceeding 10 Pa or an inert gas atmosphere of argon, helium or nitrogen. For the purpose of assured treatment effect and economy, argon or nitrogen in particular can be filled in a hermetic chamber to a pressure a little positive over the outside atmosphere.

The heat treatment of the invention decomposes and removes for the most part various adsorbed chemicals on the particle surfaces. This is advantageous in that diamond particles have collected on the surface, during the production steps, chemicals such as sulfate and nitrate, which come from the dissolution process for the removal of the metallic contaminants from the crushing medium.

While such chemicals can be removed simply by washing with water if taking much time and work. Heat treatment is also available as an efficient technique for the complete removal. It is essential that in each case the combined concentration of the remaining radicals should be less than 5 p.p.m. or the detection limit for the ion chromatography.

The diamond particles as heat-treated by the method of the invention exhibit wettability to aqueous mediums significantly decreased, due to the deposition of non-diamond carbon on the surface yielded thereby. It is effective for imparting hydrophilicity to treat such carbon-coated diamond from the heat treatment in a wet oxidizer, such as mixture of sulfuric and nitric acid at a temperature of 100° to 150° C. and, preferably, to 120° C. Hydrophilicity is attained thereby along with the removal in part of the non-diamond carbon on the surface.

For the wet oxidization described above and the evaluation of non-diamond carbon yield, these acids or oxidizers are available: $H_2SO_4$, $HNO_3$ and $HClO_4$, which may be used as the main component either singly or in combination. So the diamond typically may be treated in a mixture of sulfuric and nitric acid, heated at 120° C. Thereby the non-diamond carbon in part is removed from the surfaces of diamond particles, and there formed are hydrophilic atoms and groups such as oxygen, hydroxyl, carboxyl and carbonyl in order to improve the wettability to aqueous mediums.

The wet oxidizer described above may further comprise another selected from $KNO_3$, $CrO_3$ and $KMnO_4$.

Such atoms or groups can be provided on the particle surface by first halogenizing and then hydrolyzing. For example, diamond powder is placed in a reaction chamber and heated at 300° C., to which chlorine gas is passed in order to chlorinate the surface of diamond and non-diamond carbon, then by putting said powder into water, in order to provide hydrophilic atoms or groups.

Besides the oxidization and chlorination/hydrolysis techniques, these are also available:

For the dispersion in an aqueous medium, breaking down aggregated diamond into individual particles by means of intense vibration or shock loads. For this purpose available are ultrasonic homogenizer, dispersion medium assisted automatic shakers, and ball mills of conventional type.

Use of certain surfactant to mediate between the diamond/carbon surface and water. For this purpose is selected one or more among a wide range of anionic, non-ionic, and polycarbonic products.

Combination of the above two. For example the stability of disintegrated particles can be increased by the addition of a surfactant to the water during the process with a homogenizer.

For the purpose of this invention, which contemplates the application to the precision machining, particle sizes of 5 μm or less are suited as a starting diamond and sizes between 4 and 0.1 μm are preferred. Coarser particles are not significant for the applications in slurry state.

EXAMPLE 1

Tomei Diamond Company's IRM 0–¼ micron size diamond particles (average size 0.20 μm, as measured with a LEEDS & NORTHRUP MICROTRAC UPA ® size analyzer) were used as a starting material. 1 kg of the diamond was put in a graphite crucible, and the whole was placed in a hermetic oven, where the temperature was raised to 1150° C. while degassing. Then argon gas was filled to a pressure of 10 to 20 KPa over the atmosphere and the diamond was held at said temperature for 12 hours.

The diamond as recovered was a dark grayish mass. The particles were evidently in aggregation, as having an average particle size of 0.85 μm by MICROTRAC observation, while the ratio of the graphite and amorphous carbon, as combined, that are turned from diamond to diamond, hereinafter referred to as G-D index, was 0.50 as evaluated by Raman spectroscopy. They were placed in de-ionized water to prepare a 0.2% concentration slurry.

For the purpose of comparison, diamond, of the same grade as above but not heat-treated, was used to prepare similarly a 0.2% slurry. They both were examined in the polishing of nickel plate. The results are summarized in the table below.

TABLE 1

|  | Stock Removal (mg/min) | Surface Roughness Ra (nm) |
|---|---|---|
| Invention | 1.25 | 20.1 |
| Reference | 0.545 | 22.8 |

Here the processing efficiency was determined from the loss in weight of the nickel plate over a 20-minute long polishing period, while the surface roughness was observed by atomic force microscopy.

EXAMPLE 2

The starting material as in example 1 was used. Samples were prepared from 10 grams each of the diamond and treated in nitrogen at different temperatures. The table below summarizes the G-D index by Raman spectroscopy and the NDC (non-diamond carbon) yield or concentration as determined by acid dissolution weight loss of the combined diamond and non-diamond carbon. Efficiency was also evaluated for the polishing process of nickel plate under the same conditions as in example 1.

TABLE 2

| treatment temp. (deg. C.) | time (hour) | NDC yield (%) | G–D index | process efficiency (mg/min) | surface roughness Ra (nm) |
|---|---|---|---|---|---|
| 1000 | 48 | 0.5 | 0.1 | 0.97 | 22.0 |
| 1100 | 12 | 1.0 | 0.3 | 1.05 | 21.7 |
| 1200 | 4 | 2.5 | 0.8 | 1.44 | 13.9 |
| 1300 | 4 | 4.7 | 2.5 | 1.27 | 12.6 |
| 1400 | 2 | 8.5 | 4.0 | 0.72 | 10.1 |
| Reference (commercial polycrystalline) | — | — | 1.0 | 1.06 | 13.2 |

An increase in friability can be noticed by the observation that the efficiency was higher for the sample heat-treated at 1200° C. than the ones for both 1399° and 1400° C. On the other hand the decrease in surface roughness can be attributed to the reduction in height of the edges, which takes place at the same time as a result of carbon deposition on the diamond particles.

The processing efficiency increasing efficiency increases with the treatment temperature up to 1200° C. or so, as the self-sharpening capability improves with increasing friability and non-diamond carbon concentration. Further higher friability however lowers the processing efficiency. The surface roughness on the other hand decreases with increasing treatment temperatures, and at 1300° C. produces a surface finish as smooth or even smoother than that processed with conventional minute polycrystalline diamond.

EXAMPLE 3

The same procedures as in example 1 were used. Samples of different particle sizes were prepared from 10 grams each of the diamond and treated commonly in nitrogen at 1300° C. for 10 hours. The results are summarized in the table below for the G-D index and NDC yield, as well as the processing efficiency for a nickel plate under the same conditions as in example 1.

TABLE 3

| particle size µm | NDC yield % | G–D index (Raman spectroscopy) | process efficiency (mg/min) | surface roughness Ra (nm) (relative data[1]) |
|---|---|---|---|---|
| 0.102 | 15.0 | 3.9 | | |
| 0.155 | 8.5 | 2.0 | | |
| 0.197 | 5.5 | 1.25 | 0.82 | 12.4 (64%) |
| 0.310 | 5.0 | 0.94 | 0.90 | 15.6 (80%) |
| 0.513 | 4.1 | 0.55 | 0.97 | 23.2 (78%) |
| 1.03 | 2.9 | 0.32 | 2.24 | 27.2 (75%) |
| 2.28 | 2.5 | 0.19 | 3.71 | 36.9 (66%) |
| 3.86 | 1.5 | 0.10 | 4.79 | 38.0 (70%) |

[1]Values relative to the same grade as untreated

The particle sizes were observed with the MICROTRAC UPA Size Analyzer. 0.2% concentration aqueous slurry was prepared using ammonium polycarbonate as a surfactant which was added 1.5% by weight relative to the diamond.

The surface roughness of the polished surface was determined for the 90 mm diameter samples by atomic force microscopy (AFM), and indicated as an average over a 10 µm-sided square, which is located 17.5 mm inwards from the outer periphery.

There appears no significant correlation observed between the ratio of diamond-turned graphite and non-diamond carbon to the diamond, as determined quantitatively by the wet oxidation technique, and the G-D index as calculated from Raman spectroscopy.

EXAMPLE 4

20 grams of diamond particles as heat-treated as in example 1 were treated for imparting hydrophilicity.

The diamond was placed in a 1000 cc beaker, over which poured were 200 cc of concentrated sulfuric acid and 20 cc of concentrated nitric acid. It was then heated at 130° C. for two hours, rinsed with water, dried and weighed. 99.5% by weight of the combined diamond and non-diamond carbon was recovered; the rest being 0.5%, which was considered to be non-diamond carbon on the diamond, had been lost during and by the oxidization.

The G-D index was determined to be 2.1% for the heat-treated diamond of example 1, as treated by the wet oxidization in said acid at 300° C., instead.

Slurry was prepared from said diamond particles and tested in the polishing under the same conditions as in example 1. A polishing efficiency of 1.21 mg/min was achieved, while leaving a finished surface roughness of 21.0 nm.

EXAMPLE 5

Diamond particles heat-treated at 1300° C. as in example 2 were oxidized on the surface by a dry halogenization technique for imparting with hydrophilicity. 100 grams of as heat-treated diamond was placed in a ceramic crucible and as a whole placed in an oven. The diamond then was heated in a stream of chlorine gas at 350° C. to attach chlorine atoms to the surface. As recovered, the diamond was put in de-ionized water, taken out, rinsed with water and dried at 130° C. It was effectively used to form a thick aqueous slurry of approx. 20% concentration, as in example 3

EXAMPLE 6

A slurry was prepared from the diamond particles heated in example 2 at 1200° C. As recovered in aggregates, with a NDC yield of 2.5%, a paint shaker was used to break down the diamond. Surfactant was also used for the stabilization of the slurry. 100 grams of the heat-treated diamond was placed in a 1000 cc container, which was 60% filled by volume with 2 mm-diameter alumina balls. Further de-ionized water was poured to a level just above the balls, and the paint shaker was operated, in order to loosen the aggregates. 0.05% ammonium neutralized alkylbenzene-sulfonate, relative to the fluid, was added in order to stabilize the slurry. Suspension held for more than one hour when placed unstirred.

Slurry was also prepared from another part of the above said diamond, based on a technique of combined ultrasonic dispersion and effect of surfactant. 50 grams of the treated diamond was placed in a 2000 cc beaker, along with 1000 cc of de-ionized water. Then 1.5 grams of ammonium polycarbonate was gradually added over 20 minutes while stirring in a 300 W ultrasonic vibration bath.

The slurry thus obtained held suspension for more than one hour after the preparation.

Advantages

As described above the diamond particles of the invention are deposited with a controlled proportion of non-diamond carbons. Such diamond structure is effective for minimizing the occurrence of deep scratches and grit marks on the finished surface, as well as sticking debris of the grits, by:

(1) Reducing the intermittent loading at the moment when the diamond particles come into contact with the work,
(2) Facilitating the transfer and rolling of the loose grits between the work and polishing pad, and
(3) Decreasing the projection height of the edges above the diamond surfaces due to the deposition of a layer of non-diamond carbon.

On each diamond particle the conversion to non-diamond carbon, which essentially comprises graphite or amorphous carbon, tends to preferentially proceed during the heat treatment process at pointed ends of the projections and edges on the work surface due to the higher reactivity. The diamond of the invention, with more or less dull edges and points thus caused, achieves an improved surface finish by effectively preventing deep grit scratches or marks from occurring.

Moreover while the diamond of the invention works during the abrasive process as grits of their whole particle sizes, which are a few micrometers, they undergo effectively and continually minute cracking to provide self-sharpening effect. Such features achieve a maintained good processing efficiency, comparable with conventional polycrystalline products synthesized under detonation shock wave.

The above described advantages may be due principally to the effect of the conversion of the diamond to non-diamond carbon, which occurs as a result of the specific heat treatment and are occasionally followed by minute cracking. Such carbon deposits either on the surface or within the particles, so the intermittent impulsive loading may be moderated by this type of carbon on the surfaces of diamond particles at the moments when they come in contact with the work, and also the carbon within the particles when the latter become crushed to expose the carbon.

Industrial Applicability

The diamond abrasive of the present invention is useful for uses in slurry as dispersed and suspended in an adequate medium, and in particular adapted for the texturing process of fixed disk blanks of nickel coated aluminum base. The method is effective for producing such abrasive.

What is claimed is:

1. An abrasive powder, said powder comprising:
    diamond particles having a nominal particle size of 5 μm or less by D50 measurement, said particles comprising minute cracking on each particle, said cracking resulting from a heat treatment at a temperature of 1000° C. or more, said particles comprising 0.5 weight % or more diamond-converted non-diamond carbon relative to the whole diamond particles.

2. The abrasive powder as claimed in claim 1, further comprising at least hydrophilic atoms or hydrophilic groups combined with or attached to an outer surface of a combined body of diamond and non-diamond carbon.

3. The abrasive powder as claimed in claim 1, further comprising hydrophilic coating deposited on a surface of a combined body of diamond and non-diamond carbon.

4. The abrasive powder as claimed in claim 1, which yields, when employed in a texturing process of a nickel-coated aluminum fixed-disk blank, a worked surface having an average relative surface roughness after- to before process of 80% or less.

5. The abrasive powder as claimed in claim 2, in which said hydrophilic atom is oxygen.

6. The abrasive powder as claimed in claim 2, wherein said hydrophilic group comprises at least one group selected from the group consisting of hydroxyl, carboxyl and carbonyl.

7. The abrasive powder as claimed in claim 1, in which said non-diamond carbon comprises one selected from the group consisting of amorphous carbon, turbostratic carbon and graphite.

8. The abrasive powder as claimed in claim 1, wherein said non-diamond carbon is present in an amount not exceeding 30% relative to the whole diamond particle.

9. The abrasive powder as claimed in claim 1, wherein said diamond particles are a crushed product of coarser diamonds than originate from a static compression process, under which diamond is thermodynamically stable.

10. The abrasive powder as claimed in claim 1, wherein said diamond particles have a D50 average primary-particle size of 50 nm or more.

11. The abrasive powder as claimed in claim 1, wherein said diamond particles have a non-diamond carbon to diamond ratio of 0.1 to 4, said ratio being defined as a relative intensity between a first peak to a second peak of Raman spectrum, the first peak deriving from graphite or amorphous carbon and occurring within the range of 1500 to 1600 $cm^{-1}$, and the second peak deriving from diamond, which occurs at an approximate wave number of 1330 $cm^{-1}$.

12. The abrasive powder as claimed in claim 1, wherein said powder comprises a combined concentration of sulfuric and chloric radicals of 5 p.p.m. or less.

13. An abrasive slurry comprising the diamond particles of claim 1, dispersed in an aqueous medium.

14. A method of producing diamond abrasive powder, said method comprising:
    providing diamond particles which have a primary-particle D50 average size of 50 nm or greater and a hydrophilic surface;
    subjecting the diamond particles to a heat treatment at a temperature of 1000° C. or higher in a non-oxidizing atmosphere or in a vacuum; and
    converting the diamond partly to non-diamond carbon, while forming minute cracks in the particles.

15. The method as claimed in claim 14, wherein the temperature is not in excess of 1500° C.

16. The method as claimed in claim 14, wherein the temperature is 1100° to 1400° C., inclusive.

17. The method as claimed in claim 14, wherein the non-oxidizing atmosphere comprises an inert gas.

18. The method as claimed in claim 14, wherein the non-oxidizing atmosphere comprises a gas selected from the group consisting of nitrogen, argon and helium.

19. The method as claimed in claim 14, wherein the vacuum is at a pressure not exceeding 10 Pa.

20. The method as claimed in claim 14, wherein the diamond particles are re-collected in a form of aggregation from said heat treatment and then mechanically disintegrated into primary particles.

21. The method as claimed in claim 14, further comprising, after said heat treatment, dipping the particles in a fluid containing a dispersion of surfactant, in order to deposit thereon a hydrophilic coating.

22. The method as claimed in claim 14, further comprising recovering the diamond particles after said heat treatment and then subjecting the diamond particles to mild oxidation in a solution of oxidizer, in order to remove a portion of non-diamond carbon deposit and, at the same time, to provide at least hydrophilic atoms or hydrophilic groups, the hydrophilic groups comprising at least one selected from the group consisting of hydroxyl, carboxyl and carbonyl.

23. The method as claimed in claim 22, wherein the oxidizer comprises one selected from the group consisting of sulfuric, nitric, perchloric and chromic acid.

24. The method as claimed in claim 22, wherein the solution comprises a mixture of concentrated sulfuric acid and nitric acid, and the solution is at a temperature of 100° to 150° C.

* * * * *